United States Patent
Bowers

(10) Patent No.: US 6,959,610 B1
(45) Date of Patent: Nov. 1, 2005

(54) MANUAL PURGE SYSTEM FOR INSTRUMENTATION FLOW ELEMENT TUBING

(76) Inventor: James R. Bowers, 1453 Mars Ave., Lakewood, OH (US) 44107

( * ) Notice: Subject to any disclaimer, the term of this patent is extended or adjusted under 35 U.S.C. 154(b) by 0 days.

(21) Appl. No.: 10/769,697

(22) Filed: Feb. 2, 2004

(51) Int. Cl.[7] .............................................. G01F 1/46
(52) U.S. Cl. .................................................. 73/861.65
(58) Field of Search ........................ 73/49.5, 49.1, 73/53.01, 60.11, 182, 861.65, 861.42; 222/5, 222/148, 20, 25; 137/15.01–15.07

(56) References Cited

U.S. PATENT DOCUMENTS

| | | | | |
|---|---|---|---|---|
| 1,438,811 A | * | 12/1922 | Coyne ..................... | 73/861.65 |
| 3,380,298 A | * | 4/1968 | Wendell .................... | 73/182 |
| 3,831,448 A | * | 8/1974 | Kors et al. ............... | 73/861.65 |
| 4,174,049 A | * | 11/1979 | Bolen ....................... | 222/5 |
| 4,211,251 A | * | 7/1980 | Rickert et al. ........... | 137/565.16 |
| 4,383,547 A | * | 5/1983 | Lorenz et al. ............ | 222/148 |
| 4,498,347 A | * | 2/1985 | Grantham et al. ....... | 73/861.66 |
| 4,611,488 A | * | 9/1986 | Weingart .................. | 73/182 |
| 4,784,170 A | * | 11/1988 | Romanelli et al. ....... | 134/113 |
| 4,874,002 A | * | 10/1989 | Sundholm ................. | 137/240 |
| 4,922,937 A | * | 5/1990 | Bloch ....................... | 134/22.12 |
| 5,400,613 A | * | 3/1995 | O'Neal ..................... | 62/195 |
| 5,964,238 A | * | 10/1999 | Junkin ...................... | 222/148 |
| 6,263,889 B1 | * | 7/2001 | Flynn et al. .............. | 134/102.2 |
| 6,543,463 B1 | * | 4/2003 | Jalayer .................... | 73/861.65 |
| 6,557,570 B1 | * | 5/2003 | Gierbolini et al. ........ | 134/111 |

OTHER PUBLICATIONS

Phoenix Air Flow, Inc Ref. P-1000.2M-1.

* cited by examiner

*Primary Examiner*—Edward Lefkowitz
*Assistant Examiner*—T Miller
(74) *Attorney, Agent, or Firm*—John D. Gugliotta

(57) ABSTRACT

An improved manual purge system for periodically cleaning pressure sensing flow element tubing is provided that is a complete self-contained system for allowing manual determination and initiation of flow element purging. Additionally, the system can be easily upgraded to an automatic purge system without removal from the process system.

6 Claims, 2 Drawing Sheets

MANUAL PURGE SYSTEM FOR INSTRUMENTATION FLOW ELEMENT TUBING

RELATED APPLICATIONS

There are no previously filed, nor currently any co-pending applications, anywhere in the world.

BACKGROUND OF THE INVENTION

1. Field of the Invention

This invention relates to fluid communication tubing of the type used in fluid flow sensing elements for measuring fluid flowrates, and more specifically to a manual purge system for periodically cleaning such tubing.

2. Description of the Related Art

As is well-known in the art, fluid communication tubing, or "instrument tubing", is commonly used to communicate an instrument signal, in the form of a pneumatic pressure signal, between flow elements and pressure transmitters. Such pressure transmitters, or, more accurately, differential pressure transmitters, are commonly available to measure a pneumatic pressure, relative to atmospheric pressure, within a process system as measured by a flow element. The Pitot tube has long been a standard flow measuring element used throughout the process industries. However, in recent years improvements in such a system have been developed, as disclosed and described in U.S. Pat. No. 5,736,651, issued to the present inventor, and incorporated by reference as if fully re-written herein.

Some Pitot tube or Pitot-array flow element applicains involve measurement of particulate-laden air. A problem occurs from the use of such instrument tubing in that the traverse and sensing tubes of the fluid flow sensing elements can become obstructed by particulate within the fluid stream and therefore require frequent cleaning in order to maintain accuracy and consistency. The amount of particulate in the flowing fluid is not always specifically known or measurable, and the decision that there is a need to purge flow sensing elements is not a simple one. The amount of dirt or particulate within the fluid flow stream is difficult to quantify, and can be variable over time and work cycles. One manner of dealing with flow element purging has been to develop complicated and costly automatic purge systems that work on a timed, or other, automatically calculated basis. However, such a system is generally expensive, potentially inappropriate for the particular application, and can lead to an over engineered solution to an intermittent problem.

An alternative to the over-engineered system is the on-site determination to manually purge instrument sensing tubes. Generally, in order to make such a decision, some minimal data input is required, such as an indication of pressure loss or gain in a manner that would indicate to the operator that the sensing tubes have obstructed sensing orifices. However, such a system is usually a make-shift design, and is not upgradable to an automatically timed purge system.

Consequently, a need has been felt for providing an apparatus and method which allows for an inexpensively installed manual purge system that allows the user to determine how often purging is required and, if justified, can be adapted to the use of an automatic purge system.

SUMMARY OF THE INVENTION

It is therefore an object of the present invention to provide an improved manual purge system for periodically cleaning pressure sensing flow element tubing.

It is a feature of the present invention to provide an improved manual purge system that is a complete self-contained system for allowing manual determination and initiation of flow element purging.

Briefly described according to one embodiment of the present invention, a flow element manual purge system is provided as a system ready to install to instrument tubing connected to the high pressure connection and low pressure connection of the differential pressure flow element. The system has a first purge/operate valve connected to the high pressure tubing, and a second purge/operate valve connected to the low pressure tubing. Each purge/operate valve is anticipated as being a three-way valve having an entry port, an exit port, and a discharge port. With the entry port in fluid communication with the pressure tubing, the discharge port is in fluid communication with a high pressure purge gas or liquid source, depending upon whether the flowing fluid is gas or liquid. Each exit port is in fluid communication with the inlets of an instrument zeroing and isolating valve, with the outlets of the zeroing and isolating valve in fluid communication with a differential pressure gauge.

An advantage of the present invention is that it provides an improved manual purge system that is a complete self-contained system for allowing manual determination and initiation of flow element purging.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENT

The best mode for carrying out the invention is presented in terms of its preferred embodiment, herein depicted within the Figures.

1. Detailed Description of the Figures

Figure 1:
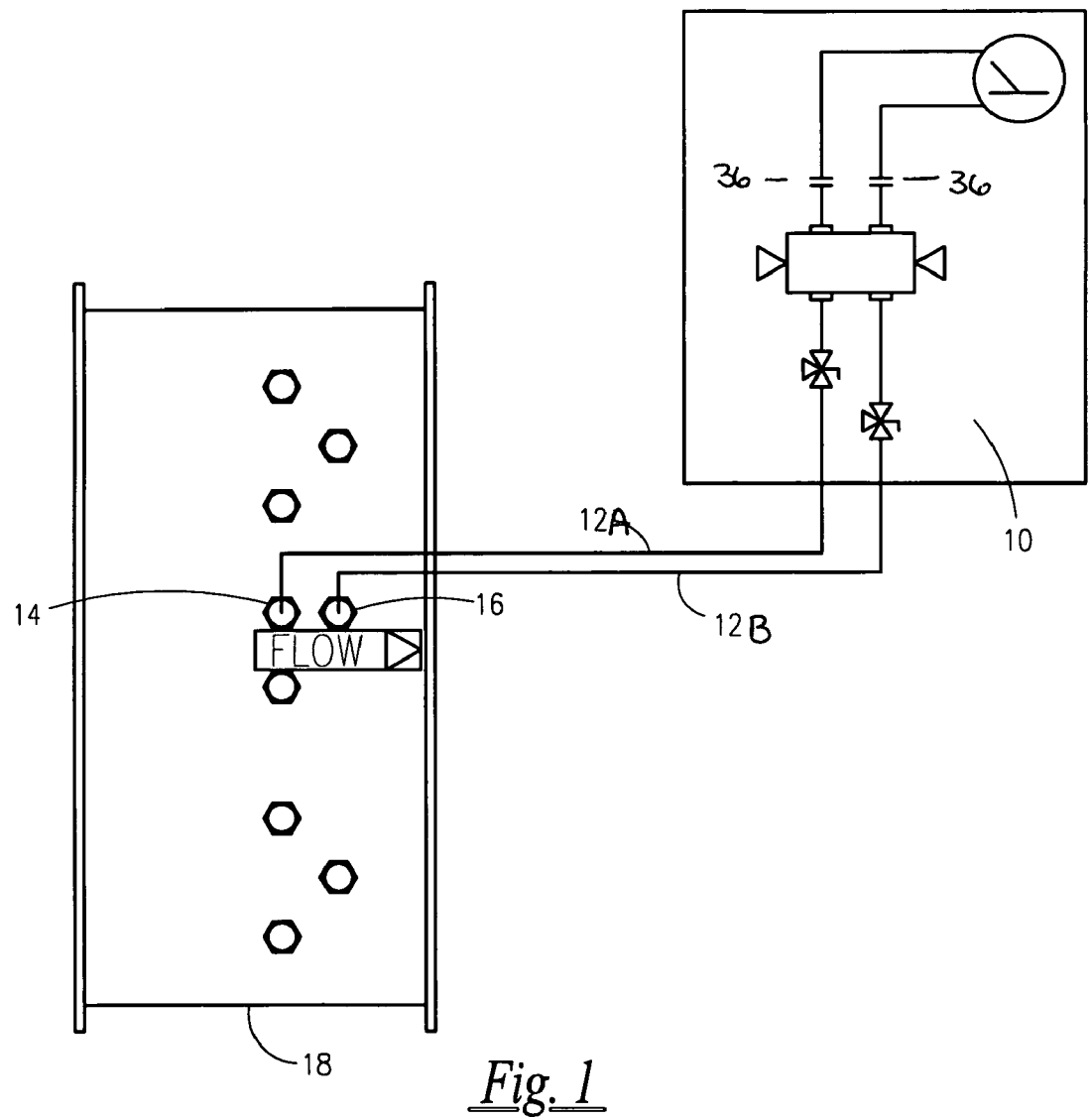
FIG. 1 is a functional schematic diagram of the manual purge system according to the preferred embodiment of the present invention.
Figure 2:
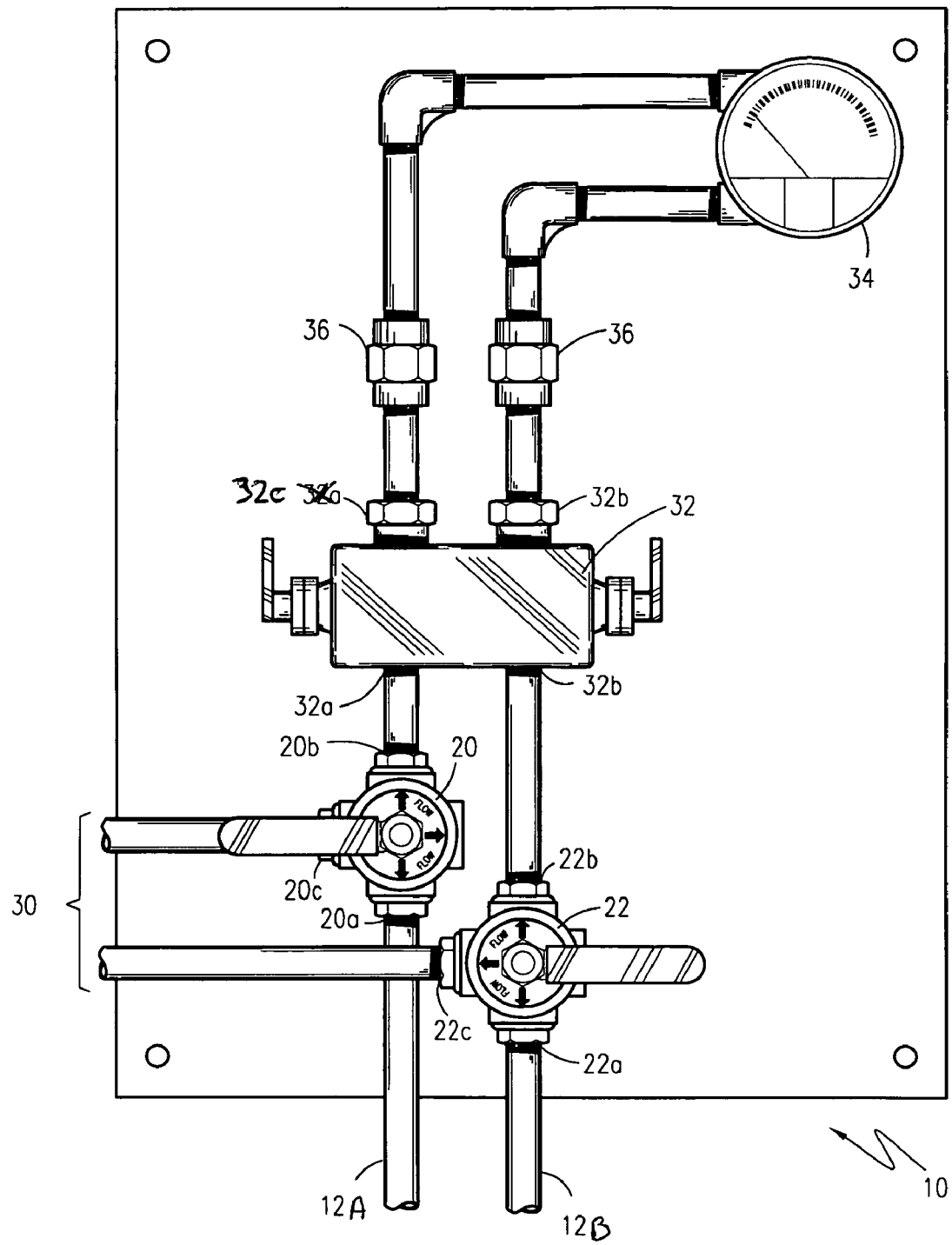
FIG. 2 is a front elevational view thereof.

Referring now to FIGS. 1–2, a flow element manual purge system 10 is shown, according to the present invention, ready to install to instrument tubing 12 connected to the high pressure connection 14 (i.e., high pressure tubing 12A) and low pressure connection 16 of a flow element 18 (i.e., low preessure tubing 12B). The system 10 has a first purge/operate valve 20 connected to the high pressure tubing 12, and a second purge/operate valve 22 connected to the low pressure tubing 12. It is anticipated that the manual purge system 10 is adaptable to be attached to an automatic purge system without disconnecting said instrument tubing 12 from said manual purge system via a removable connection means 36 within the connection between the valves 20, 22 and any differential pressure instrument in a manner adaptable to be reconnected if later required. Each purge/operate valve 20, 22 is anticipated as being a three-way valve having an entry port 20a, 22a, an exit port 20b, 22b, and a discharge port 20c, 22c. With the entry port 20a, 22a in fluid communication with the pressure tubing 12, the discharge port 20c, 22c is in fluid communication with a high pressure purge source 30. Each exit port 20b, 22b is in fluid communication with a pair of inlets 32a, 32b, respectively of an instrument zeroing and isolating valve 32, with the outlets 32c, 32d of the zeroing and isolating valve 32 in fluid communication with a differential pressure instrument 34. The use of this three-way valve permits "zero check and adjustment" of a differential pressure instrument by isolating the instrument from the process connections.

2. Operation of the Preferred Embodiment

To use the present invention, the flow measuring instrument must be isolated from the flow element prior to the beginning of a purge cycle. If the instrument is a transmitter, provisions must be made to maintain the existing instrument output signal to the receiver instrument. This is done within the capability of some pressure instruments, but otherwise it must be done by the receiver instrument or else the system must be put into manual operating mode until the purge cycle is complete.

The main purge supply valve from the purge fluid source 30 is opened and the two purge valves, one on each of the two instrument lines, are then opened, admitting high pressure purge fluid to the lines connecting the flow element and the instrument. The purge fluid application point must be close to the instrument to assure purging of all of the piping from the instrument to the flow element.

The instrument tubing must be large enough so as not to restrict the high volume purge fluid flow. A purge flow meter can be added downstream of the purge valve to monitor the purge rate. No flow at this point during the purge process indicates that the flow element is completely plugged and requires more drastic intervention. If heavy plugging is suspected, the tubes must be brushed manually or otherwise removed for cleaning. If the normal operation is intermittent, any cleaning can be done during downtime of the flow measurement system.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents. Therefore, the scope of the invention is to be limited only by the following claims.

What is claimed is:

1. In a differential pressure flow element and instrument system requiring a purge fluid means and having a high pressure connection in fluid communication with a first instrument tubing and a low pressure connection in fluid communicating with a second tubing, wherein the improvement comprises:

a free standing flow element manual purge system ready to install to said first instrument tubing and said second instrument tubing and for providing a means of manually purging said flow element and instrument tubing using high pressure purge fluid in fluid communication therewith through said free standing flow element manual purge system.

2. The improvement of claim 1, wherein said manual purge system is adaptable to be attached to an automatic purge system without disconnecting said instrument tubing from said manual purge system.

3. The improvement of claim 1, wherein said free standing flow element manual purge system comprises:

a first purge/operate valve connected to said high pressure tubing and having an exit port;

a second purge/operate valve connected to said low pressure tubing and having an exit port;

each said purge/operate valve in fluid communication with a high pressure purge fluid source;

wherein each said exit port is in fluid communication with the inlets of an instrument zeroing and isolating valve.

4. The improvement of claim 3, wherein said free standing flow element manual purge system further comprises:

a differential pressure instrument in fluid communication with said outlets of said zeroing and isolating valve.

5. The improvement of claim 4, wherein said free standing flow element manual purge system further comprises:

removable connection means within the connection between said instrument zeroing and isolating valve and said differential pressure instrument;

wherein said removable connection means is adaptable to be reconnected to an automatic purge system if later required.

6. The improvement of claim 3, wherein each said purge/operate valve comprises a three-way valve having an entry port, an exit port, and a discharge port.

* * * * *